Oct. 13, 1936.   W. R. SEIGLE   2,057,251
VIBRATION DAMPING ASSEMBLY AND MATERIAL
Filed March 13, 1935
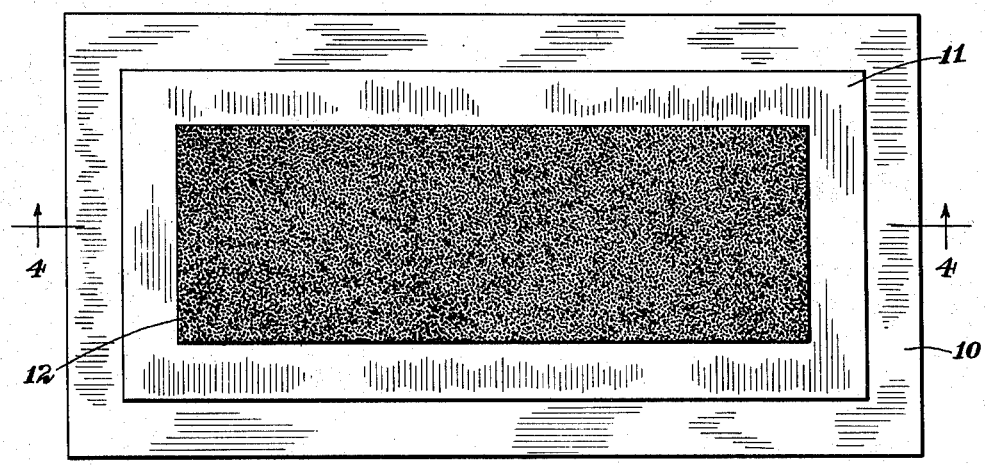
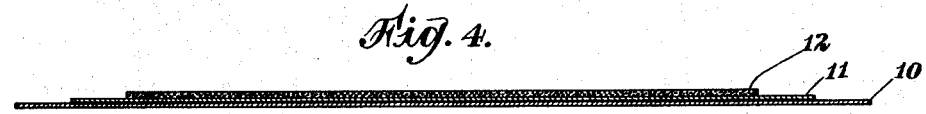
INVENTOR.
William R. Seigle.
BY D. N. Halstead
ATTORNEY.

Patented Oct. 13, 1936

2,057,251

UNITED STATES PATENT OFFICE 2,057,251

VIBRATION DAMPING ASSEMBLY AND MATERIAL

William R. Seigle, Mamaroneck, N. Y., assignor to Johns-Manville Corporation, New York, N. Y., a corporation of New York Application March 13, 1935, Serial No. 10,956

6 Claims. (Cl. 154—44)

This invention relates to a vibration-damped structure and to damping material adapted for use therein.

There is extensive use of vibration-damping material in the industries using sheet metal. Such material is applied to concealed surfaces of metal furniture, to eliminate the tinny sound ordinarily emitted when the furniture is struck or a drawer or door thereof is closed. Likewise, damping material is applied to the interior of sheet metal automobile bodies, to eliminate the rumbling sound frequently developed at high speeds.

It has been customary, heretofore, to effect the damping by the application to the vibratile object of special felts or of a spraying composition including asphalt and particles of lightweight bulk-adding filler, such as ground cork. It is expensive and frequently inconvenient to apply a felt of adequate weight, thickness, or area or a sufficient mass of a spray composition of low density. Furthermore, there is the objection to the spray composition that the final layer is not preformed and, as applied with solvents, say to an automobile body, must be thoroughly dried in order to avoid excessive bleeding or spotting of upholstery cloth applied over the inside of the vibration-damping material.

The present invention comprises means of overcoming disadvantages of previously known vibration-damping materials and assemblies. For instance, the present invention comprises a vibration-damping material of the spray or continuous fluid type, but of high internal friction and density, preapplied to a felt, to give a preformed combination that is very effective and adapted to be applied to a vibratile object by a simple cementing operation. The invention comprises, also, felt including dense mass-adding particles dispersed throughout the felt, with preservation of the yieldability of the felt and with increased effectiveness in damping, due to the increased mass or density. Other objects and advantages of the invention will be evident from the following description and appended claims.

The invention will be illustrated by description in connection with the attached drawing in which Fig. 1 shows a plan view of a preferred embodiment of the invention;

Fig. 2 shows a cross sectional view of a modified form of assembly;

Fig. 3 shows a cross sectional view of a vibration-damped assembly including an improved form of damping felt; and Fig. 4, shows a sectional view on line 4—4 of Fig. 1.

In the various figures like reference characters denote like parts.

There are shown a vibratile object 10, such as a sheet metal panel of an automobile or metal desk, a layer 11 of felt adhered to the panel, and a layer 12 of vibration-damping material adhered to the said felt.

When vibrating, the object 10 will have varying amplitudes of vibration at various positions throughout the object, the amplitude being greatest at antinodal positions. To reduce the amount of vibration-damping material required, the combination of the damping members 11 and 12 may be so placed, with respect to the object 10, that the center of gravity of the combination of damping materials lies approximately over the normal position of greatest amplitude of vibration of the said object, the word "normal" referring to the condition obtaining when the object is allowed to vibrate without any damping material associated therewith.

The felt 11 is yieldable and inelastic and of any suitable composition. I have used to advantage a rag felt that is partially saturated with an impregnating material, such as asphalt, the proportion of impregnating material being such that the felt is made water and weather-resistant but is substantially free from bleeding of the impregnating material therefrom at temperatures up to about 275° F. or somewhat higher.

The vibration-damping material 12 is a nonporous composition including a fluid, yieldable under vibratory impulses but of high coefficient of internal friction, such as asphalt or heavy pitch, and dense particles, for instance, of specific gravity equal approximately at least to that of sand. The particles are dispersed in the fluid. They increase substantially the overall internal resistance or mass, with preservation of yieldability of the continuous fluid medium. The said particles should be largely in non-contacting relationship to each other, so that vibratory impulses imparted to the composition 12 may readily cause yielding of the films of fluid surrounding the discrete particles.

For this composition 12, there may be used a viscous mixture including particles of sand, granules of slate or the like and a fluid of the type of a blown asphalt-like material. The dense particles are used in large proportion, say in the proportion of 2 to 6 parts by weight to 1 of the fluid.

In the embodiment shown in Fig. 1, the composition 12 is applied to the back of the felt 11, that is, on the side of the felt remote from the vibratile object. The felt 11, in turn, is secured to the vibratile object by a suitable non-brittle adhesive or cement (not shown). In the modification shown in Fig. 2, the composition 12 is disposed between the vibratile object and the felt 11 and serves as a cementing layer, of substantial mass and thickness, adhering the felt to the object 10. The relatively thick, heavy vibration-damping layer 12, as used in Fig. 2, reduces greatly the energy of the vibration which reaches the felt 11 and minimizes, therefore, the tendency of the felt 11 to become dislodged, even after long-continued vibration of the vibratile object. At the same time, the felt 11, applied over the exposed face of the composition 12, serves to stiffen the composition and to minimize bleeding thereof, as by absorption into the felt of any excess of fluent ingredient that may appear on the surface during long use of the said composition.

To obtain a similar effect of increased mass, with preservation of yieldability and non-bleeding tendencies, the vibration-damping sheet shown in Fig. 3 may be used. This consists of a suitable felt including fibrous material and dense particles 13 such as sand or slate, embedded in discrete manner in the felt, preferably substantially uniformly therethroughout. Thus, the felt may be one made by a method comprising the suspending of dense fine particles of sand or the like with fibres, as in a paper beater or paper stock mixing tank, and quickly felting the mixture on a paper machine, before the sand has an opportunity to separate largely from the fibres. The result is a felted product in which the dispersed dense particles add substantially to the mass and make more difficult the overall displacement of the product when applied to a vibratile object, while preserving local yieldability, thereby giving improved vibration-damping properties.

The structures described are of outstanding merit. Thus, tests show that a combination as shown in Fig. 1 having an area of felt of 360 square inches and an area of the plastic composition 12 of 180 square inches, making a total of 540 square inches, applied over the normal position of maximum vibration of a vibratile sheet metal, is more effective than 616 square inches of the felt alone, applied in single thickness to the panel. Furthermore, the plastic composition is less expensive per unit area or mass than is the sheet 11 of felted fibres.

The details that have been given are for the purpose of illustration, not restriction. It is intended that variations within the spirit of the invention should be included within the scope of the claims.

What I claim is:

1. A vibration-damped structure including a vibratile object, a yieldable and inelastic felt adhered to the said object, and a non-porous layer of vibration-damping material adhered to the felt, the said vibration-damping material including a fluid of high internal friction and a large proportion of dense particles dispersed in non-contacting relationship in the said fluid.

2. A vibration-damped structure including a vibratile object, a yieldable and inelastic felt adhered to the said object, and a non-porous layer of vibration-damping material continuously adhered to the side of the felt remote from the vibratile object, the said vibration-damping material including a fluid of high internal friction and a large proportion of dense particles dispersed in non-contacting relationship in the said fluid.

3. A vibration-damped structure including a vibratile object, a yieldable and inelastic felt, and a non-porous cementing layer of vibration-damping material of substantial thickness and mass adhering the felt to the said vibratile object, the said vibration-damping material including a fluid of high internal friction and a large proportion of dense particles dispersed in non-contacting relationship in the said fluid.

4. A vibration-damped structure comprising a vibratile object and a damping sheet adhered thereto, the said sheet including felted fibres and dense particles dispersed, in discrete form, throughout the felt and between the fibres, whereby the yieldability of the sheet is preserved and the mass thereof is substantially increased.

5. A vibration-damping yieldable sheet including felted fibres and dense particles dispersed throughout the sheet and held, in non-contacting relationship to each other, by the said fibres, whereby the yieldability of the sheet is preserved and the mass thereof is increased.

6. An article of manufacture for use in damping vibrations of a vibratile object comprising a yieldable and inelastic felt and a layer of vibration-damping material adhered to the felt, the said material including a fluid of high internal friction and a large proportion of dense particles dispersed in non-contacting relationship in the said fluid.

WILLIAM R. SEIGLE.